(12) United States Patent
Cheng et al.

(10) Patent No.: US 11,454,192 B2
(45) Date of Patent: Sep. 27, 2022

(54) ANTIPOLISHING RING

(71) Applicant: Cummins Inc., Columbus, IN (US)

(72) Inventors: Chao Cheng, Columbus, IN (US); Neal R. Phelps, Seymour, IN (US); Andrew Laughlin, Franklin, IN (US); Scott Daniel Saum, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/898,561

(22) Filed: Jun. 11, 2020

(65) Prior Publication Data

US 2020/0300195 A1 Sep. 24, 2020

Related U.S. Application Data

(63) Continuation of application No. PCT/US2018/063189, filed on Nov. 30, 2018.
(Continued)

(51) Int. Cl.
*F02F 3/28* (2006.01)
*F02F 1/00* (2006.01)
*F16J 10/04* (2006.01)

(52) U.S. Cl.
CPC .............. *F02F 3/28* (2013.01); *F02F 1/00* (2013.01); *F16J 10/04* (2013.01); *F02F 2001/006* (2013.01)

(58) Field of Classification Search
CPC ...... F02F 3/28; F02F 1/00; F02F 1/004; F02F 11/005; F02F 2001/006; F16J 10/04
See application file for complete search history.

(56) References Cited

U.S. PATENT DOCUMENTS 2,334,273 A * 11/1943 Mason ................... F16J 9/20
277/463
5,553,585 A 9/1996 Paro
(Continued)

FOREIGN PATENT DOCUMENTS

| CN | 105041470 A | 11/2015 |
|---|---|---|
| EP | 1061294 B1 | 4/2003 |
| WO | 2004022960 A1 | 3/2004 |

OTHER PUBLICATIONS

International Preliminary Report on Patentability; International Searching Authority; International Application No. PCT/US2018/063189; dated Jun. 25, 2020; 6 pages.
(Continued)

*Primary Examiner* — Grant Moubry
(74) *Attorney, Agent, or Firm* — Taft Stettinius & Hollister LLP

(57) ABSTRACT

Unique apparatuses and methods for scraping deposits from a piston as the piston moves in an upstroke direction and a downstroke direction. An engine assembly includes a cylinder having a cylinder bore, a piston having a crown end, wherein the piston is disposed in the cylinder bore and configured to move in an upstroke direction and a downstroke direction relative to the cylinder bore. The piston includes a first land positioned adjacent the crown end. An antipolishing ring is disposed within the cylinder bore. The antipolishing ring has an outer annular surface and an inner annular surface, the inner annular surface has one or more protrusions configured to scrape the first land when the piston moves in the upstroke direction and the downstroke direction. The protrusions are also configured to scrape the first land when the piston has secondary or lateral motion.

16 Claims, 3 Drawing Sheets

Related U.S. Application Data

(60) Provisional application No. 62/598,512, filed on Dec. 14, 2017.

(56) References Cited

U.S. PATENT DOCUMENTS

| | | | | |
|---|---|---|---|---|
| 6,289,872 B1* | 9/2001 | Dardalis | ............... | F01B 15/007 |
| | | | | 123/190.12 |
| 6,367,463 B1 | 4/2002 | Nurmi | | |
| 7,438,037 B2* | 10/2008 | Oogake | .................. | F02F 1/004 |
| | | | | 123/193.2 |
| 7,484,493 B2* | 2/2009 | Bischofberger | .......... | F02F 1/00 |
| | | | | 123/193.2 |
| 7,677,217 B2* | 3/2010 | Kumar | .................... | F02F 1/004 |
| | | | | 123/193.2 |
| 8,851,042 B2 | 10/2014 | Imhasly | | |
| 9,316,312 B2* | 4/2016 | Jenness | ..................... | F16J 9/06 |
| 9,541,198 B2* | 1/2017 | Hofbauer | ................... | F16J 9/16 |
| 10,125,869 B2* | 11/2018 | Jenness | .................... | F16J 9/062 |
| 10,487,779 B2* | 11/2019 | Beasley | ................. | F02F 11/002 |
| 2010/0319661 A1* | 12/2010 | Klyza | ..................... | F16J 9/063 |
| | | | | 123/51 R |
| 2017/0002734 A1 | 1/2017 | Watanabe et al. | | |

OTHER PUBLICATIONS

International Search Report; International Searching Authority; International Application No. PCT/US2018/063189 dated Feb. 4, 2019; 2 pages.

Written Opinion of the International Searching Authority; International Searching Authority; International Application No. PCT/US2018/063189; dated Feb. 4, 2019; 5 pages.

Extended European Search Report; European Patent Office; European Application No. 18887456.4; dated Jul. 22, 2021; 6 pages.

\* cited by examiner

ANTIPOLISHING RING

CROSS-REFERENCE TO RELATED APPLICATION

The present application is a continuation of International Patent Application No. PCT/US18/63189 filed on Nov. 30, 2018, claims the benefit of the filing date of U.S. Provisional Application No. 62/598,512 filed on Dec. 14, 2017, which is incorporated herein by reference.

BACKGROUND

The present application relates generally to an antipolishing ring for scraping deposits off a piston of an internal combustion engine, and more particularly to a feature on the antipolishing ring.

Internal combustion engines include one or more cylinders wherein each cylinder includes a piston in the cylinder bore. During combustion cycle, the piston moves in an upstroke direction and a downstroke direction relative to the cylinder bore. An antipolishing ring is placed in the cylinder bore to remove deposits that can accumulate on the sides of the top or crown end of the piston. During the primary motion wherein the piston moves in an upstroke direction and a downstroke direction along the cylinder bore center line, the piston also tilts back and forth or side to side in a secondary motion. During this secondary motion, it is possible that one side, either the thrust or the anti-thrust side of the piston tilts toward the antipolishing ring inner diameter and deposits are scraped off that side of the piston. In the upstroke direction of movement of the piston, the deposits on the side of the piston that tilts away from the antipolishing ring inner diameter are not scraped off. As a result, deposits build up on the piston over time and can result in polishing the corresponding side of the cylinder liner inner diameter. To compound this issue, the piston will change direction when it moves in a downstroke direction and tilt back to the other side. The antipolishing ring does not scrape the deposits off this other side during the downstroke of the piston. Therefore, deposits will continue to build up on the piston over time and cause cylinder liner polishing which reduces the durability of the internal combustion engine.

Therefore, further contributions in this area of technology are needed to improve the durability of the engine. Therefore, there remains a significant need for the apparatuses, methods and systems disclosed herein.

SUMMARY

One embodiment is a unique system, method, and apparatus that includes an engine assembly comprising a piston having a crown end with a first land adjacent the crown end, the piston disposed in the cylinder bore and configured to move in an upstroke direction and a downstroke direction relative to the cylinder bore, and an antipolishing ring disposed within the cylinder bore. The antipolishing ring has an outer annular surface and an inner annular surface, wherein the inner annular surface includes a protrusion configured to scrape the first land when the piston moves in the upstroke direction and the downstroke direction. There are many different configurations of the protrusion that are configured to scrape the first land of the piston when the piston moves in the upstroke direction and the downstroke direction.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION OF ILLUSTRATIVE EMBODIMENTS

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

Figure 1:
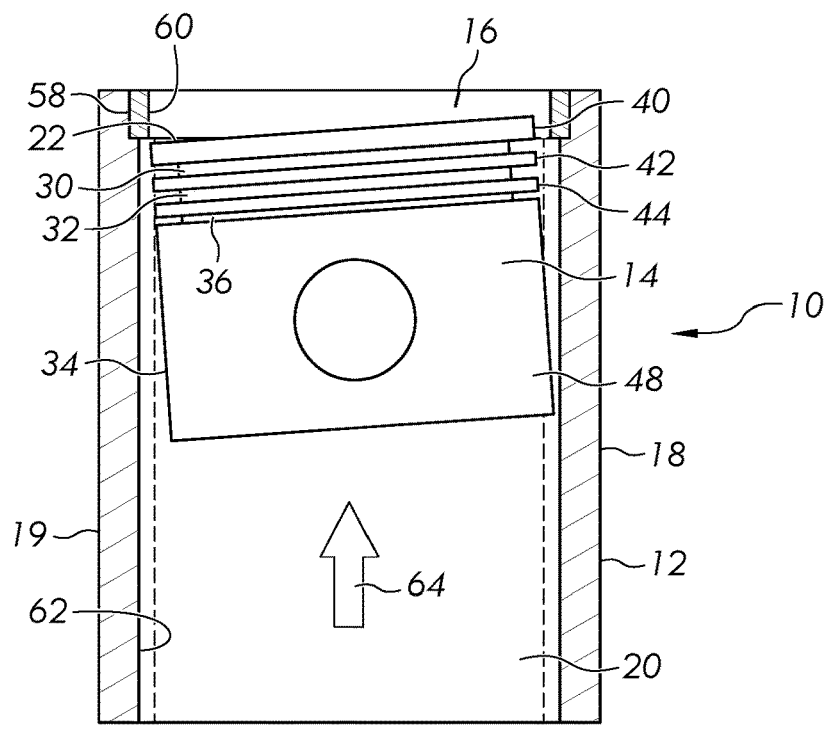
FIG. 1 is a partial cross-sectional view of a prior art embodiment of an engine assembly that illustrates a piston in an upstroke direction.
Figure 2:
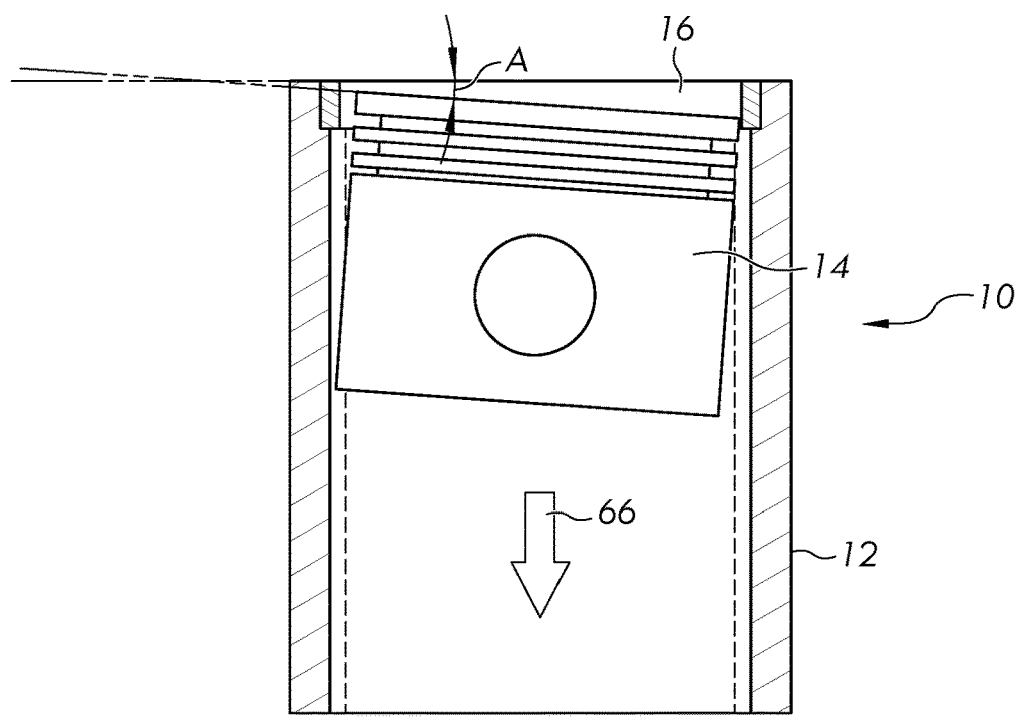
FIG. 2 is a partial cross-sectional view of the engine assembly of FIG. 1 wherein the piston is in a downstroke direction.

With reference to FIGS. 1 and 2, there is illustrated a schematic view of a prior art exemplary embodiment of an engine assembly 10. The engine assembly 10 includes a cylinder 12, a piston 14, and an antipolishing ring 16. The cylinder 12 includes a cylinder bore 20 sized to receive the piston 14 therein. The cylinder 12 includes a thrust side 18 and an antithrust side 19 for reference and discussion purposes only. The piston 14 is a type that is used in an internal combustion engine wherein the piston 14 is disposed in the cylinder bore 20 of the cylinder 12. The piston 14 has a crown end 22 which is near contact with the cylinder bore 20 and the cylinder head of the engine (not shown) to define a combustion chamber.

The piston 14 includes a first annular groove 30 and a second annular groove 32 wherein the first annular groove 30 is positioned near the crown end 22 and the second annular groove 32 is positioned adjacent to the first annular groove 30. In the illustrated embodiment, the piston 14 includes a third annular groove 36 wherein the third annular groove 36 is positioned adjacent to the second annular groove 32. In the illustrated embodiment, the second annular groove 32 is located between the first annular groove 30 and the third annular groove 36. In alternative embodiments, it is contemplated that the piston 14 includes any of the first, second, and third grooves 30, 32, and 36. The piston 14 includes an outer cylindrical surface 34 with or without any profile that is the outer surface of the piston 14.

The piston 14 includes a top or first land 40 at the crown end 22 and adjacent the first annular groove 30. The first land 40 has a diameter that is larger than a diameter of the first annular groove 30. The piston 14 also includes a second land 42 disposed between the first annular groove 30 and the second annular groove 32 wherein the second land 42 has a diameter that is larger than both the diameter of the first annular groove 30 and the diameter of the second annular groove 32. The piston 14 also includes a third land 44 disposed between the second annular groove 32 and the third annular groove 36 wherein the third land 44 has a diameter that is larger than both the diameter of the second annular groove 32 and a the diameter of the third annular groove 36. The piston 14 also includes a piston skirt 48 that extends from the third annular groove 36 towards an end opposite the crown end 22.

The antipolishing ring 16 is positioned in the cylinder bore 20 at the top of the bore 20 such that the antipolishing ring 16 surrounds a portion of the first land 40 of the piston 14 when the piston 14 moves to a top dead center position. The antipolishing ring 16 can be positioned in an annular recess 58 formed in the cylinder bore 20. The antipolishing ring 16 can have an inner diameter 60 that is smaller than an inner diameter 62 of the cylinder bore 20.

As illustrated in FIGS. 1 and 2, during the primary motion wherein the piston 14 moves in an upstroke direction 64 and a downstroke direction 66 along the center line of the cylinder bore 20, the piston 14 also tilts back and forth or side to side in a secondary motion. The secondary motion is illustrated in FIGS. 1 and 2 as an angle A measured relative to the crown end 22.

During this secondary motion, it is possible that one side, either the thrust 18 or anti-thrust side 19 at the first land 40, of the piston 14 tilts toward the inner diameter 60 of the antipolishing ring 16 and deposits are scraped off the corresponding side of the piston 14 during the upward direction movement 64. In this condition, the deposits on the side of the first land 40 of the piston 14 that tilts away from the inner diameter 60 of the antipolishing ring 16 are not scraped off when the piston 14 moves in the upward direction 64. As a result, deposits build up on the piston 14 over time and can result in polishing the corresponding side of the cylinder bore 20. To compound this issue, the piston 14 will change direction when it moves in the downstroke direction 66 and tilt back to the other side. The antipolishing ring 16 does not scrape the deposits off this other side during the downstroke direction 66 of the piston 14. Therefore, deposits will continue to build up on the piston 14 over time and cause cylinder liner or bore polishing which reduces the durability of the internal combustion engine.

Figure 3:
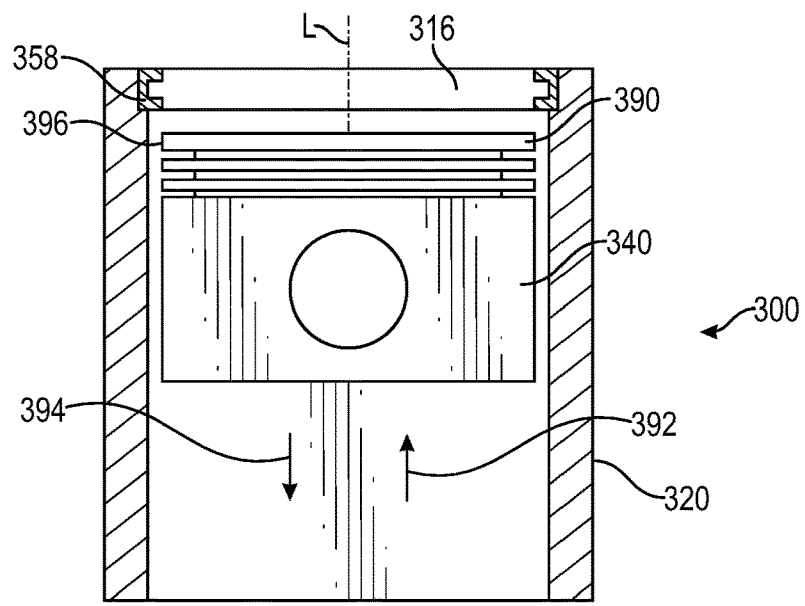
FIG. 3 is a partial cross-sectional view of an engine assembly of the present disclosure.

With reference to FIG. 3, there is illustrated a schematic view of an exemplary embodiment of an engine assembly 300 according to the present disclosure. The engine assembly 300 includes a cylinder 320, a piston 340, and an antipolishing ring 316. The cylinder 320 and the piston 340 are substantially similar to the cylinder 12 and the piston 14, respectively, illustrated in FIG. 3, therefore for the sake of brevity similar features will not be described unless noted otherwise.

Figure 4:
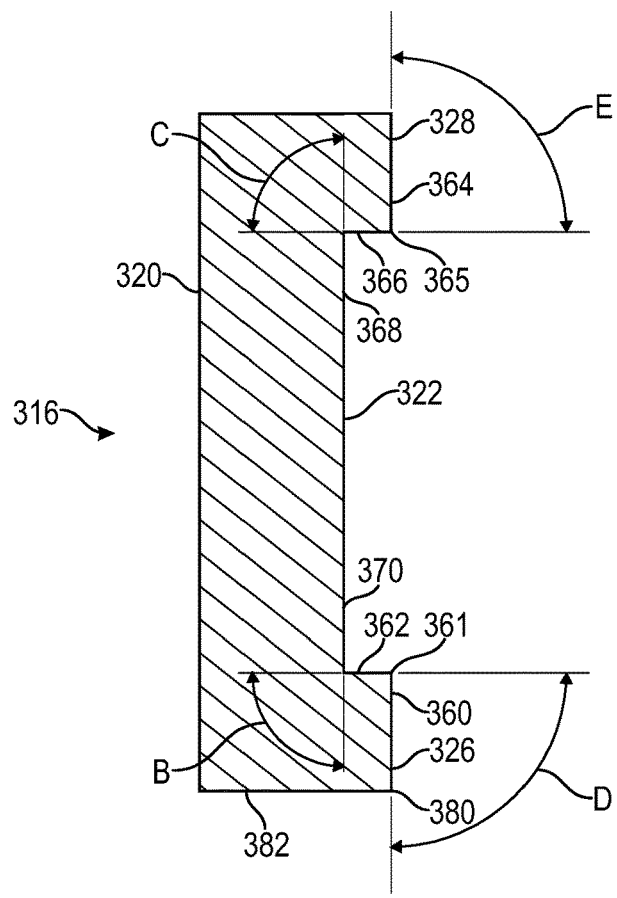
FIG. 4 is a partial cross-sectional view of an antipolishing ring of the engine assembly of FIG. 3 of the present disclosure.

A cross-sectional view of the antipolishing ring 316 is illustrated in FIG. 4. The antipolishing ring 316 includes an outer annular surface 320 and an inner annular surface 322 and a thickness therebetween. The outer annular surface 320 has an outer diameter that is larger than an inner diameter of the inner annular surface 322. The outer annular surface 320 is sized to fit in a recess 358 of the cylinder 320. The inner annular surface 322 includes a first protrusion 326 longitudinally offset from a second protrusion 328 relative to a longitudinal axis L of the antipolishing ring 316. One or both of the first protrusion 326 and the second protrusion 328 are configured to scrape a crown end 390 and in particular a first land 396 of the piston 340 when the piston 340 moves in an upstroke direction 392, a downstroke direction 394, and a lateral direction. More particularly, the first protrusion 326 is configured to scrape the first land 396 of the piston 340 when the piston 340 moves in the upstroke direction 392, the downstroke direction 394, and the lateral direction.

The first protrusion 326 includes a first inner face 360 that extends to a first lip 362 with a first edge 361 there between. The first lip 362 extends from the inner annular surface 322 to the first edge 361. The first protrusion 326 having the first inner face 360 that extends from the first edge 361 to a third edge 380 positioned along a lower face 382 of the antipolishing ring 316. The second protrusion 328 includes a second inner face 364 that extends to a second lip 366 with a second edge 365 there between. The first inner face 360 has a first inner diameter and the second inner face 362 has a second inner diameter. The first inner face 360 and the second inner face 362 extend vertically along the longitudinal axis L. In the illustrated form, the first inner diameter is the same as the second inner diameter. In other forms, the first inner diameter is smaller or larger than the second inner diameter such that one of the first or the second protrusions 326 and 328 overhangs the other one of the first or the second protrusions 326 and 328. The first lip 362 forms an angle B with the inner annular surface 322. The first lip 362 forms an angle D with the first inner face 360. The second lip 366 forms an angle C with the inner annular surface 322. The second lip 366 forms an angle E with the second inner face 364. The angles B, C, D, and E are substantially right angles. In other embodiments, the angles B, C, D, and E are obtuse or acute angles.

The inner annular surface 322 includes a recessed portion 368 positioned between the first protrusion 326 and the second protrusion 328. The recessed portion 368 has a longitudinal face 370 that extends along the longitudinal axis L. The longitudinal face 370 has an inner diameter that is larger than both of the first inner diameter of the first inner face 360 and the second inner diameter of the second inner face 364.

The piston 340 is configured to move in the upstroke direction 392 and the downstroke direction 394 relative to the cylinder bore, and as the piston 340 moves the first protrusion 326 and/or the second protrusion 328 scrape the carbon or other deposit at the crown end 390 of the piston 340. More specifically, the piston 340 includes a first land 396 positioned on the crown end 390, and the first protrusion 326 and/or the second protrusion 328 scrape the first land 396 when the piston 340 moves in the upstroke direction 392 and moves in the downstroke direction 394 to remove any deposits or debris such as carbon on the first land 396. The first edge 361 and the second edge 365 are configured to scrape debris or deposits, including carbon, from the first land 396 of the piston 340.

Figure 5:
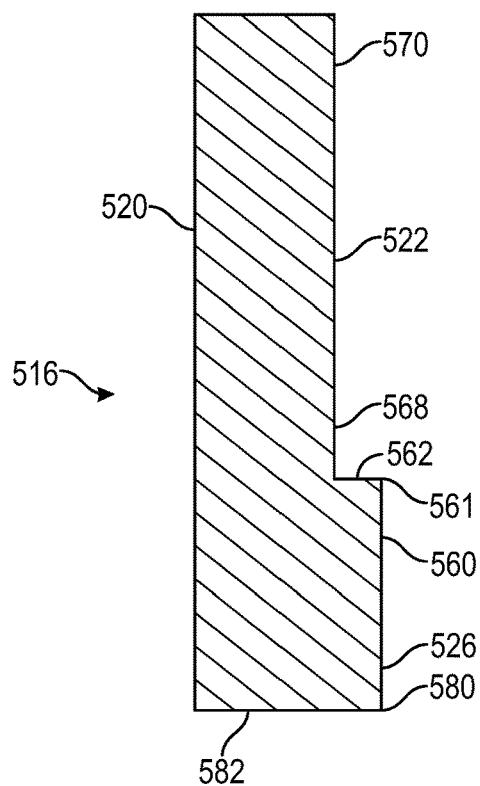
FIG. 5 is a partial cross-sectional view of an antipolishing ring suitable for use with the engine assembly of FIG. 3 of the present disclosure.

Another antipolishing ring 516 according to the present disclosure is illustrated in FIG. 5. The antipolishing ring 516 is configured for assembly with the engine assembly 300, specifically, the cylinder 320 and the piston 340. The antipolishing ring 516 includes an outer annular surface 520 and an inner annular surface 522 and a thickness therebetween. The outer annular surface 520 has an outer diameter that is larger than an inner diameter of the inner annular surface 522. The outer annular surface 520 is sized to fit in a recess 358 of the cylinder 320. The inner annular surface 522 includes a first protrusion 526. The first protrusion 526 scrapes the carbon or other deposit at the crown end 390 of the piston 340 when the piston 340 moves in the upstroke direction 392 and the downstroke direction 394.

The first protrusion 526 includes a first inner face 560 that extends to a first lip 562. The first inner face 560 has a first inner diameter that is smaller than the diameter of the inner annular surface 522. In the illustrated embodiment, the first lip 562 forms a right angle with the inner annular surface 522. In other embodiments, the first lip 562 forms an obtuse or acute angle with the inner annular surface 522. The first lip 562 extends from the inner annular surface 522 to a first edge 561. The first protrusion 526 having the first inner face 560 that extends from the first edge 561 to a third edge 580 positioned along a lower face 582 of the antipolishing ring 516.

The inner annular surface 522 includes a recessed portion 568 positioned adjacent the first protrusion 526. The recessed portion 568 has a longitudinal face 570 having an inner diameter that is larger than the first inner diameter of the first inner face 560.

The piston 340 is configured to move in the upstroke direction 392 and the downstroke direction 394 relative to the cylinder bore, and as the piston 340 moves the first protrusion 526 scrapes the carbon or other deposit at the crown end 390 of the piston 340. More specifically, the first protrusion 526 scrapes the first land 396 when the piston 340 moves in the upstroke direction 392 and moves in the downstroke direction 394 to remove any deposits or debris such as carbon on the first land 396.

Figure 6:
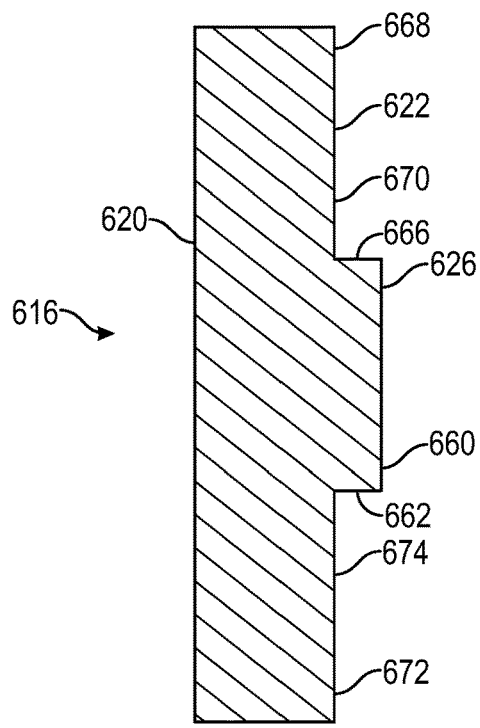
FIG. 6 is a partial cross-sectional view of an antipolishing ring suitable for use with the engine assembly of FIG. 3 of the present disclosure.

Another antipolishing ring 616 according to the present disclosure is illustrated in FIG. 6. The antipolishing ring 616 is configured for assembly with the engine assembly 300, specifically, the cylinder 320 and the piston 340. The antipolishing ring 616 includes an outer annular surface 620 and an inner annular surface 622 and a thickness therebetween. The outer annular surface 620 has an outer diameter that is larger than an inner diameter of the inner annular surface 622. The outer annular surface 620 is sized to fit in a recess 358 of the cylinder 320. The inner annular surface 622 includes a first protrusion 626. The first protrusion 626 scrapes the carbon or other deposit at the crown end 390 of the piston 340 when the piston 340 moves in the upstroke direction 392 and the downstroke direction 394.

The first protrusion 626 includes a first inner face 660 that extends to a first lip 662 and a second lip 666. The first inner face 660 has a first inner diameter that is smaller than the diameter of the inner annular surface 622. In the illustrated embodiment, the first lip 662 and the second lip 666 each form a right angle with the inner annular surface 622. In other embodiments, the first lip 662 and the second lip 666 each form an obtuse or acute angle with the inner annular surface 622.

The inner annular surface 622 includes a first recessed portion 668 positioned adjacent the first protrusion 626 and a second recessed portion 672 positioned adjacent the other side of the first protrusion 626. The first recessed portion 668 has a first inner face 670 having an inner diameter that is larger than the first inner diameter of the first inner face 660. The second recessed portion 672 has a second inner face 674 having an inner diameter that is larger than the first inner diameter of the first inner face 660. The inner diameters of the first and second recessed portions 668 and 672 can be the same or different.

The piston 340 is configured to move in the upstroke direction 392 and the downstroke direction 394 relative to the cylinder bore, and as the piston 340 moves the first protrusion 626 scrapes the crown end 390 of the piston 340. More specifically, the first protrusion 626 scrapes the first land 396 when the piston 340 moves in the upstroke direction 392 and moves in the downstroke direction 394 to remove any deposits or debris such as carbon on the first land 396.

Various aspects of the present disclosure are contemplated. According to one aspect, an engine assembly, comprising: a cylinder having a cylinder bore; a piston having a crown end with a first land adjacent the crown end, the piston disposed in the cylinder bore and configured to move in an upstroke direction and a downstroke direction relative to the cylinder bore; and an antipolishing ring disposed within the cylinder bore, the antipolishing ring having an outer annular surface and an inner annular surface, the inner annular surface including a protrusion configured to scrape the first land when the piston moves in the upstroke direction and the downstroke direction.

In one aspect, the protrusion is configured to scrape the first land when the piston moves in a lateral direction.

In one aspect, the protrusion is positioned at a lower end of the inner annular surface as measured relative to a longitudinal axis of the antipolishing ring.

In one aspect, the protrusion spans around a circumference of the inner annular surface. In one aspect, the protrusion includes an inner face having an inner diameter that is smaller than a diameter of the inner annular surface. In one refinement, the protrusion includes a lip adjacent the inner face and an inner edge therebetween, the inner edge configured to scrape the first land of the piston. In another refinement, the protrusion includes a first protrusion longitudinally offset from a second protrusion as measured relative to a longitudinal axis of the antipolishing ring. In another refinement, the first protrusion is below the second protrusion as defined relative to the longitudinal axis.

In another refinement, the first protrusion includes a first inner face having a first inner diameter, the second protrusion includes a second inner face having a second inner diameter, wherein the first inner diameter is substantially the same as the second inner diameter.

In another refinement, the first protrusion includes a first inner face having a first inner diameter, the second protrusion includes a second inner face having a second inner diameter, wherein the first inner diameter is smaller than the second inner diameter. In another refinement, the inner annular surface includes a recessed portion positioned between the first protrusion and the second protrusion. In a further refinement, the recessed portion has a longitudinal face that extends along a longitudinal axis, the longitudinal face having a diameter that is larger than the first inner diameter.

According to one aspect, a method, comprising: moving a piston in an upstroke direction relative to a cylinder bore, wherein the piston has a crown end and a first land adjacent the crown end, the piston is disposed in a cylinder bore of a cylinder; during the moving of the piston in the upstroke direction, scraping the first land of the piston with an antipolishing ring positioned in the cylinder bore, wherein the antipolishing ring includes an inner annular surface having a protrusion configured to scrape a deposit on the first land of the piston; moving the piston in a downstroke direction relative to the cylinder bore; and during the moving of the piston in the downstroke direction, scraping the deposit on the first land of the piston with the protrusion on the antipolishing ring.

In one embodiment the method further comprises moving the piston in a lateral direction; and scraping the first land of the piston with the protrusion on the antipolishing ring.

In one embodiment, the protrusion spans around a circumference of the inner annular surface. In one refinement, the protrusion includes an inner face having an inner diameter that is smaller than a diameter of the inner annular surface, wherein the scraping includes scraping the first land with the inner face of the protrusion.

In one embodiment, the protrusion includes a first protrusion longitudinally offset from a second protrusion as measured relative to a longitudinal axis of the antipolishing ring, wherein the scraping includes scraping the first land with at least one of the first protrusion and the second protrusion during the moving of the piston in the downstroke direction. In one refinement, the scraping includes scraping the first land with at least one of the first protrusion and the second protrusion during the moving of the piston in the upstroke direction.

In one refinement, the first protrusion includes a first inner face and the second protrusion includes a second inner face, wherein the scraping includes scraping the first land with at least one of the first inner face and the second inner face during the moving of the piston in the upstroke direction and during the moving of the piston in the downstroke direction.

In one refinement, the first protrusion is below the second protrusion as defined relative to the longitudinal axis.

In one refinement, the first inner diameter is substantially the same as the second inner diameter.

In one refinement, the first inner diameter is smaller than the second inner diameter.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

It should be understood that while the use of words such as preferable, preferably, preferred or more preferred if utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An engine assembly, comprising:
   a cylinder having a cylinder bore, the cylinder bore further defining a recess sized to retain an antipolishing ring therein;
   a piston having a crown end with a first land adjacent the crown end, the piston disposed in the cylinder bore and configured to move in an upstroke direction and a downstroke direction relative to the cylinder bore; and
   the antipolishing ring disposed within the recess of the cylinder bore, the antipolishing ring having an outer annular surface and an inner annular surface, the inner annular surface including a first protrusion longitudinally offset from a second protrusion as measured relative to a longitudinal axis of the antipolishing ring, the first protrusion having a first inner face with a first inner diameter that is smaller than a diameter of the inner annular surface, the first protrusion having a first lip that extends from the inner annular surface to a first edge and the first protrusion having the first inner face that extends from the first edge to a second edge positioned along a lower face of the antipolishing ring, wherein the first and second edges are configured to scrape the first land when the piston moves in a lateral direction, and at least one of the upstroke direction and the downstroke direction.

2. The engine assembly of claim 1, wherein the first protrusion is positioned at a lower end of the inner annular surface as measured relative to a longitudinal axis of the antipolishing ring.

3. The engine assembly of claim 1, wherein the first protrusion spans around a circumference of the inner annular surface.

4. The engine assembly of claim 1, wherein the first protrusion is below the second protrusion as defined relative to the longitudinal axis.

5. The engine assembly of claim 1, wherein the second protrusion includes a second inner face having a second inner diameter, wherein the first inner diameter is substantially the same as the second inner diameter.

6. The engine assembly of claim 1, wherein the second protrusion includes a second inner face having a second inner diameter, wherein the first inner diameter is smaller than the second inner diameter.

7. The engine assembly of claim 1, wherein the inner annular surface includes a recessed portion positioned between the first protrusion and the second protrusion, wherein the recessed portion has a longitudinal face that extends along a longitudinal axis, the longitudinal face having a diameter that is larger than the first inner diameter.

8. A method, comprising:
   moving a piston in an upstroke direction relative to a cylinder bore, wherein the piston has a crown end and a first land adjacent the crown end, the piston is disposed in a cylinder bore of a cylinder;
   during the moving of the piston in the upstroke direction the piston moves in a lateral direction, scraping the first land of the piston with an antipolishing ring positioned in a recess disposed in the cylinder bore as the piston moves in the lateral direction, wherein the antipolishing ring includes an inner annular surface having a first protrusion longitudinally offset from a second protrusion as measured relative to a longitudinal axis of the antipolishing ring, the first protrusion with a first lip that extends from the inner annular surface to a first edge and the first protrusion having a first inner face that extends from the first edge to a second edge positioned along a lower face of the antipolishing ring, wherein the first and second edges are configured to scrape a deposit on the first land of the piston;

moving the piston in a downstroke direction relative to the cylinder bore; and during the moving of the piston in the downstroke direction the piston moves in a lateral direction, scraping the deposit on the first land of the piston with the first and the second edges of the protrusion on the antipolishing ring as the piston moves in the lateral direction.

9. The method of claim 8, wherein the first protrusion spans around a circumference of the inner annular surface.

10. The method of claim 9, wherein the second protrusion includes a second inner face having an inner diameter that is smaller than a diameter of the inner annular surface, wherein the scraping includes scraping the first land with the second inner face of the protrusion.

11. The method of claim 9, wherein the scraping includes scraping the first land with at least one of the first protrusion and the second protrusion during the moving of the piston in the downstroke direction.

12. The method of claim 11, wherein the scraping includes scraping the first land with at least one of the first protrusion and the second protrusion during the moving of the piston in the upstroke direction.

13. The method of claim 11, wherein the second protrusion includes a second inner face, wherein the scraping includes scraping the first land with at least one of the first inner face and the second inner face during the moving of the piston in the upstroke direction and during the moving of the piston in the downstroke direction.

14. The method of claim 11, wherein the first protrusion is below the second protrusion as defined relative to the longitudinal axis.

15. The method of claim 13, wherein the first inner diameter is substantially the same as the second inner diameter.

16. The method of claim 13, wherein the first inner diameter is smaller than the second inner diameter.

* * * * *